Aug. 5, 1958　　　G. BARKER, JR　　　2,846,282
TABLE EXTENDABLE IN HEIGHT AND SIZE
Filed Nov. 18, 1955　　　　　　　　8 Sheets-Sheet 1

INVENTOR.
GUY BARKER, JR.
BY
Curtis, Morris & Safford
ATTORNEYS

Aug. 5, 1958  G. BARKER, JR  2,846,282
TABLE EXTENDABLE IN HEIGHT AND SIZE
Filed Nov. 18, 1955  8 Sheets-Sheet 2

INVENTOR.
GUY BARKER, JR.
BY
Curtis, Morris & Safford
ATTORNEYS

Aug. 5, 1958 G. BARKER, JR 2,846,282
TABLE EXTENDABLE IN HEIGHT AND SIZE
Filed Nov. 18, 1955 8 Sheets-Sheet 3

INVENTOR.
GUY BARKER, JR.
BY
Curtis, Morris & Safford
ATTORNEYS

Aug. 5, 1958 G. BARKER, JR 2,846,282
TABLE EXTENDABLE IN HEIGHT AND SIZE
Filed Nov. 18, 1955 8 Sheets-Sheet 4

INVENTOR.
GUY BARKER, JR.
BY
Curtis, Morris & Safford
ATTORNEYS

FIG. 9a.
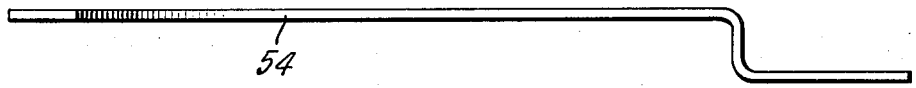
FIG. 9b.
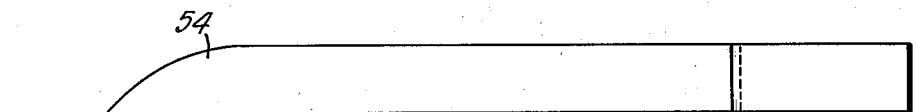
FIG. 10a.     FIG. 10c
FIG. 10b.
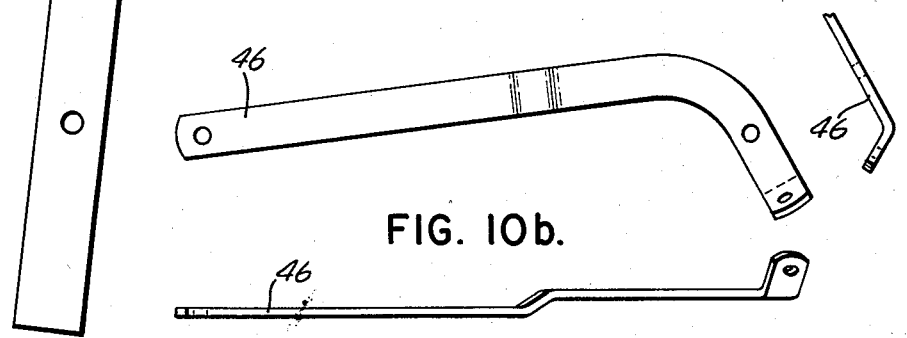
FIG. 11a.
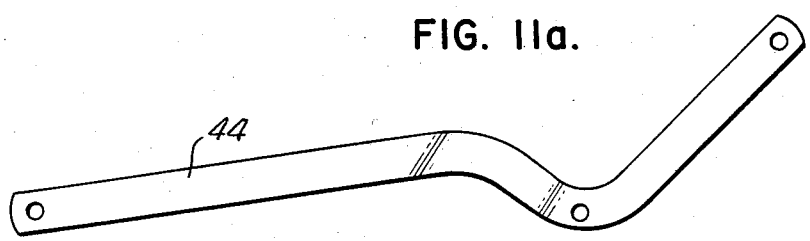
FIG. 11b.
*INVENTOR.*
*GUY BARKER, JR.*

Aug. 5, 1958 G. BARKER, JR 2,846,282
TABLE EXTENDABLE IN HEIGHT AND SIZE
Filed Nov. 18, 1955 8 Sheets-Sheet 6

INVENTOR.
GUY BARKER, JR.
BY
Curtis, Morris & Safford.
ATTORNEYS

Aug. 5, 1958      G. BARKER, JR      2,846,282
TABLE EXTENDABLE IN HEIGHT AND SIZE
Filed Nov. 18, 1955      8 Sheets-Sheet 7
FIG. 14.
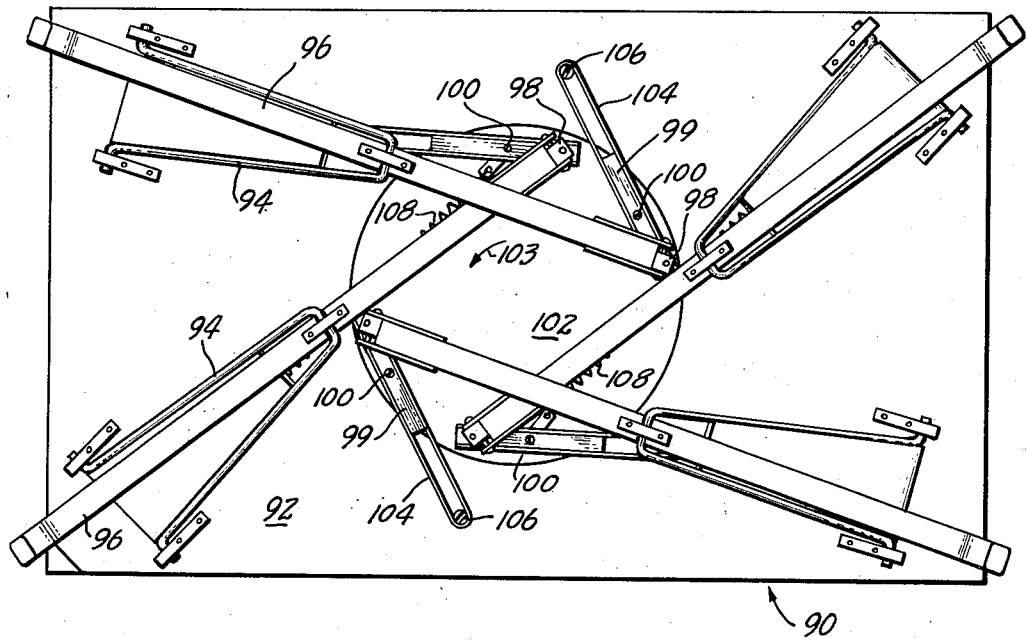
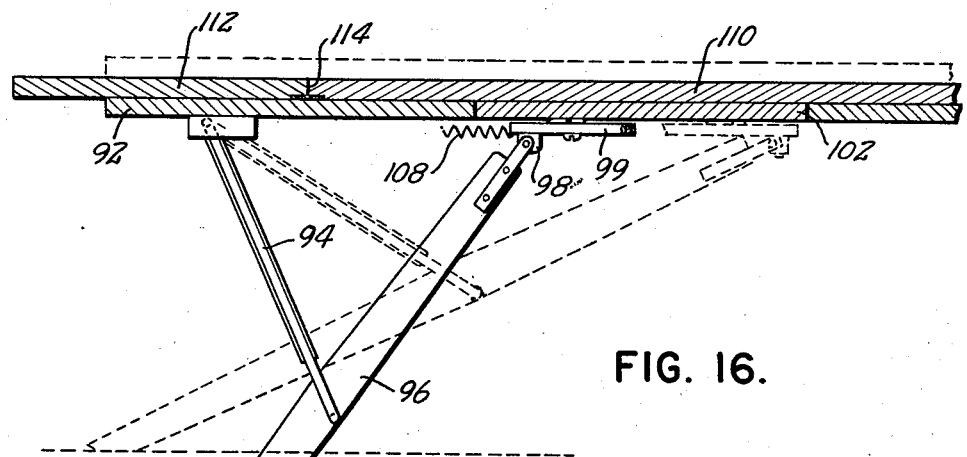
FIG. 16.
INVENTOR.
GUY BARKER, JR.
BY
Curtis, Morris & Safford
ATTORNEYS

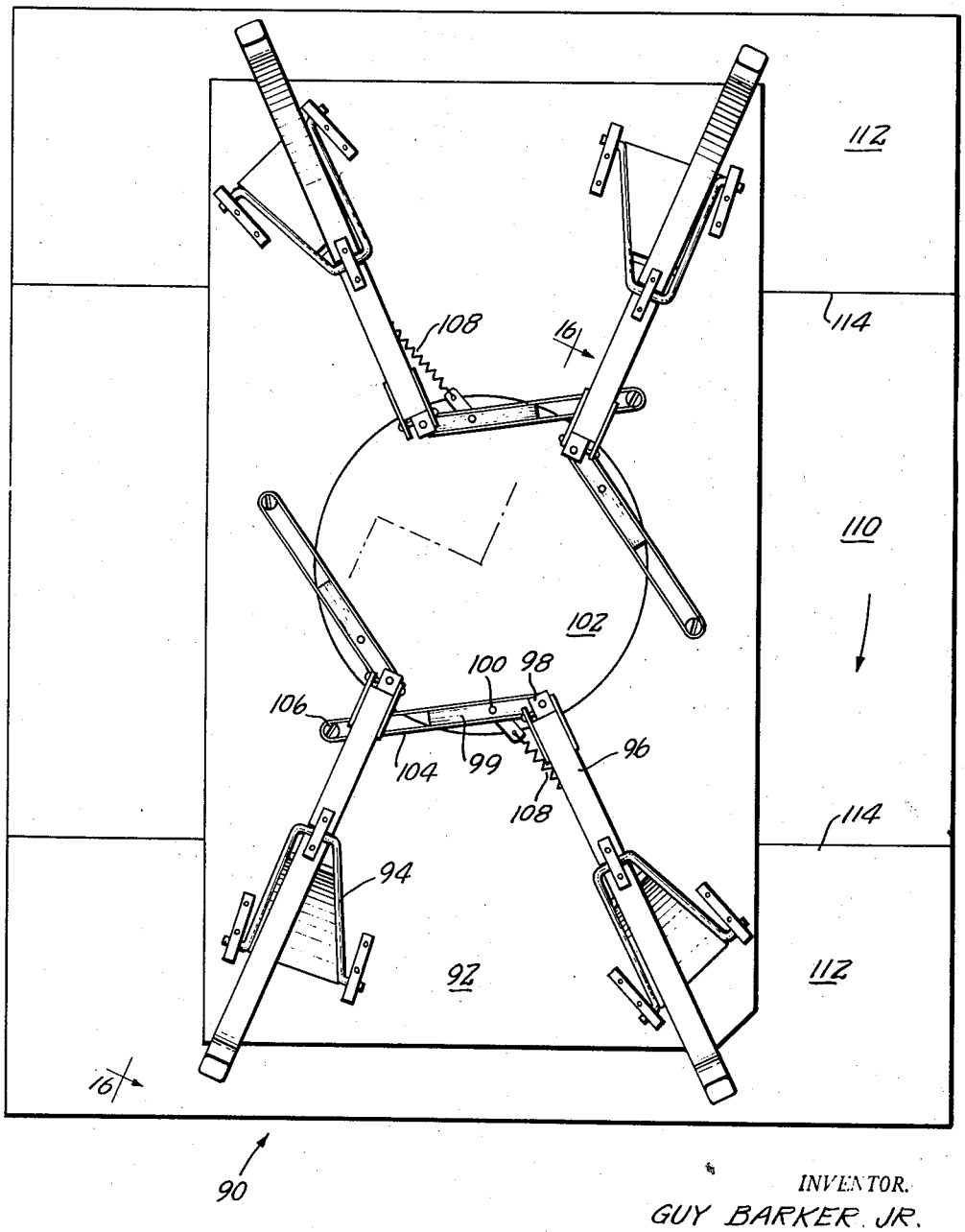

United States Patent Office 2,846,282
Patented Aug. 5, 1958

2,846,282

TABLE EXTENDABLE IN HEIGHT AND SIZE

Guy Barker, Jr., Roxbury, Conn.

Application November 18, 1955, Serial No. 547,611

25 Claims. (Cl. 311—39)

This invention relates to a table which can be raised and opened from a low, folded position wherein it is suitable as a cocktail or magazine table to a high position wherein it is suitable as a dining table.

An object of the invention is to provide such a table which is as sturdy and as convenient to use as an ordinary dining table but which, when not being so used, can be folded to much smaller size and height and used for other purposes.

Another object is to provide a simple and efficient mechanism for controlling the height of such a table.

A further object is to provide such a table which can be extended to high position very easily evn though the table is relatively heavy and which in either high or low position has a pleasing appearance not marred by bulky or unwieldly mechanism or peculiar shape.

Where space is at a premium, as in many present day apartments, it is highly desirable to have furniture which can do double duty. This fact accounts for the great popularity and widespread use of convertible furniture, such as sofa-beds, for example. Though the same situation applies with like force to dining tables, none heretofore and so far as is known has really met with widespread favor. Undoubtedly, there are various good reasons for this but lack of demand or need is not one of them.

Among the principal requirements which an article of convertible furniture must satisfy to appeal to the buyer are pleasant appearance, ease of operation, and convenience. Thus, with many of the convertible dining tables previously devised, too utilitarian appearance blighted and overshadowed their otherwise good features. On the other hand, and probably more often, previous tables have been unsuccessful because they were too clumsy and inconvenient to use.

A convertible table which extends to a size big enough for dining is necessarily relatively heavy. Consequently the table must have strong sturdy legs whose feet are well separated to give the necessary stability. However, working at cross-purpose to the need for stability is the requirement that the legs be properly spaced apart and placed under the table to permit a full number of people to sit comfortably at the table without straddling a table leg or practically sitting on top of it. With an ordinary dining table it is relatively easy to provide, for example, four relatively slender legs conveniently spaced around the table since these legs can be attached to the table in fixed relation and need only bear weight generally straight downward on them and not tending to bend them. With a convertible table of the same size, however, since the legs must be movable with respect to the table top, the problems of leg-strength, -placement, and -size are greatly complicated. The present invention provides a unique solution to these problems, combining at the same time stylish appearance, ease of operation, and stability in a convertible table.

In accordance with one aspect of the present invention, a table top and frame are fitted with four slender legs whose feet are widely spaced for stability, these legs being each movable relative to the frame along independent tracks thereby to satisfy the requirement for sufficient extension of the table from low to high position and the requirement for convenient leg spacing. When extended to its full height the table can be unfolded to greater size by means of leaves ordinarily recessed within the table frame when the table is in low position.

In accordance with another aspect of the invention, the operating mechanism for the table is made so that very little effort is required to raise the table from low to high position even though the table is relatively heavy. This operating mechanism is very simple and it is almost completely automatic. Thus, with a single short throw of a lever the table is raised from low to high position and locked, and the leaves normally recessed within the table frame are easily unfolded. When raised to high position, the spacings between the feet of the table legs remain substantially as great as when the table is in low position, and the legs are securely locked thus giving both stability and rigidity. The operating mechanism, for all its performance, is very compact and does not detract from the pleasing appearance of the table; in fact, the table is hardly distinguishable from an ordinary dining table when extended and unfolded, or from an ordinary cocktail table when in low position.

In accordance with another aspect of the invention, when the table is raised, but not unfolded, the bottom surfaces of the leaves are left lying slightly below the top level of the frame so that the table can be used for a small size dining or card table and will present a good appearance. However, when the leaves are to be unfolded, they are automatically raised above the level of the frame by a very slight rotation and thereafter, when unfolded, are permitted to rest on the frame, being locked in place. This automatic raising of the leaves above the level of the frame prevents wear on the top of the frame when the leaves are rotated to unfolding position, an important feature from the standpoint of continuing good appearance.

A better understanding of the invention together with a fuller appreciation of its many advantages will best be gained from the following description given in connection with the accompanying drawings in which:

Figures 9a and 9b are side and top views respectively of the operating lever;

Figure 12:
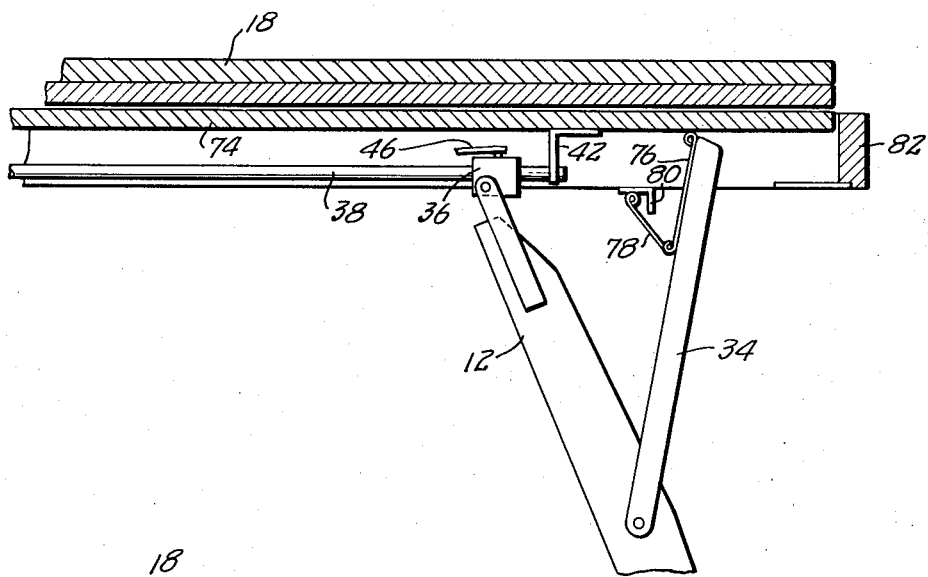
Figure 13:
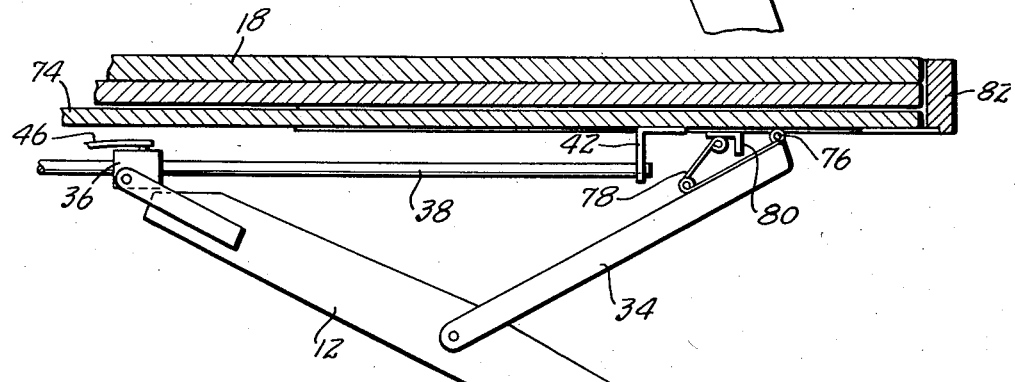

Figures 10a, 10b, and 10c are top, side and end views respectively of a connecting link of the operating mechanism;

Figures 11a and 11b are top and side views respectively of another connecting link;

Figure 12 is a side section view of a second embodiment of the invention illustrating a table with a movable rather than a fixed frame, the table here being in raised position;

Figure 13 is a side section view of the table of Figure 12 showing it in lowered position;

Figure 14 shows another embodiment of the invention illustrating in a bottom view a different leg operating mechanism, the legs being in low position;

Figure 15 is a bottom view of the table of Figure 14 showing the legs in high position; and Figure 16 is a section view taken along lines 16—16 in Figure 15.

Figure 1:
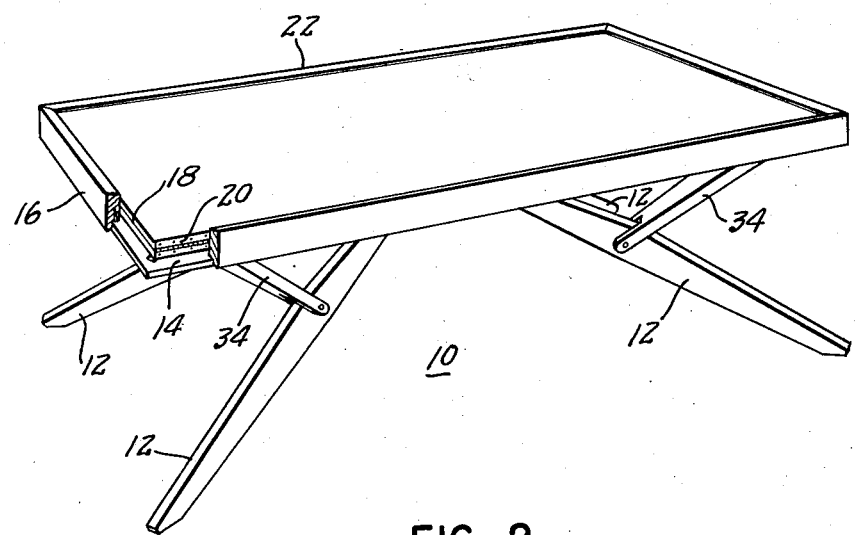
Figure 1 is a perspective view of one embodiment of the invention showing a table in low position and illustrating how the leaves thereof are recessed within the table frame.

Referring now to Figure 1, the table 10 shown herein is in lowered position. It has four legs 12 which are pivoted at their tops to the deck 14, this deck being rigidly fixed to the frame 16. As seen at the broken away left front corner of the frame, two leaves 18 hinged at 20 are recessed within the frame and lie against the deck 14.

Figure 2:
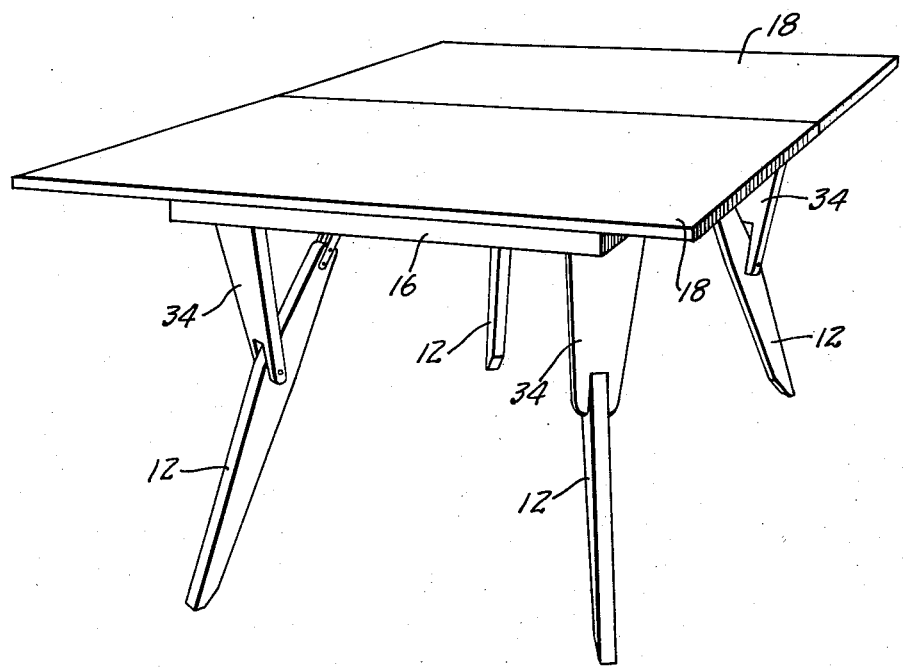
Figure 2 is a perspective view of the table of Figure 1 shown here in high position and with its leaves extended.

Figure 2 shows table 10 in raised position with leaves 18 unfolded and rotated to extend the size of the table. These leaves rest on the frame 16 and are rotatably locked in position, as will appear. The top ends of legs 12 have been moved apart from their position in Figure 1 to raise the height of the table. By comparing the spacings shown in Figure 2, it will be seen that they are substantially the same for either the high or the low position of the table. As a result, when the table is raised its feet need not be lifted free of the floor.

When table 10 is raised, leaves 18 are automatically raised relative to frame 16 just below the top edge 22 of the frame which is slightly beveled toward the inside, as shown in Figure 1. To bring the leaves into position for unfolding, they are first rotated around the floating pivot 24 connects between the bottom surface of the leaves and deck 14.

Figure 3:
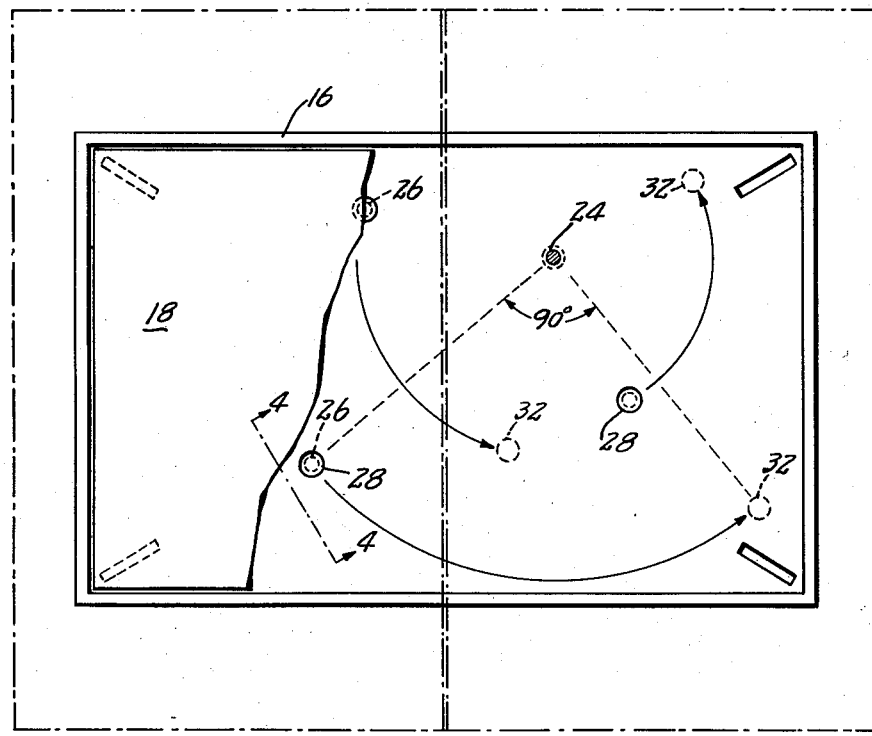
Figure 3 is a top view of the table illustrating how the leaves are rotated and unfolded.
Figure 4:
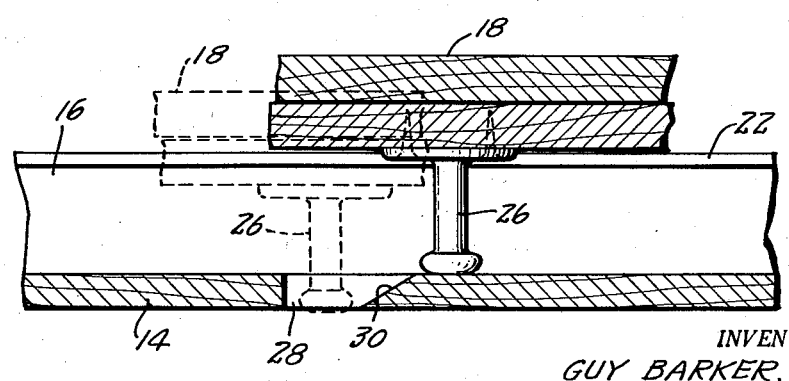
Figure 4 is a section view along line 4—4 in Figure 3 showing one of the glides which raises the bottom surface of the leaves above the top of the table frame.

The first instant the leaves 18 begin to rotate they are further raised relative to frame 16 so that their bottom surface moves slightly above the top 22 of the frame. This supplemental raising is accomplished by the three glides 26, one of which is shown in Figure 4, which are attached to the bottom side of the bottom one of the leaves 18 and which are positioned to mate with the three holes 28 in deck 14. One of these holes is shown in section in Figure 4 and their spacing is indicated in Figure 3.

As seen in Figure 4, before the leaves 18 are rotated relative to frame 16, and when the table is in raised position, the bottom of each glide 26 extends into its respective hole 28 and is slightly below the level of the deck 14. In this condition the bottom surface of the leaves is slightly lower than the top of frame 16. As soon as the leaves 18 are rotated about their pivot 24, each glide 26 climbs up the beveled surface 30 in the forward edge of its respective hole 28 and raises leaves 18 just above top 22. Thereafter these leaves can be rotated to the dotted line position shown in Figure 3 without rubbing against the top of the frame. Just as the leaves reach this dotted line position, the glides 26 descend into the three holes 32 positioned as shown and shaped like holes 28. This causes the leaves to rest against the top of frame 16 and holds them from accidentally rotating. By providing each of the holes 28 and 32 with a beveled surface, such as surface 30, at its forward edge only, the leaves can only be rotated through the particular 90 degree arc shown in Figure 3.

As seen in Figures 1 and 2, each of the legs 12 is pivotally connected at a point intermediate its top and bottom to a respective one of the arms 34. These arms 34 are in turn pivoted to the deck 14. In raising table 10 from low to high position the tops of legs 12 are moved along independent tracks on the bottom of deck 14 toward the pivot points of arms 34. These tracks, as will appear, lie generally along the diagonals of the deck and frame and thus permit a substantially longer travel for the tops of the legs. This in turn permits the table to be raised from low to high without decreasing the spacings of the feet of legs 12. Moreover it makes possible the placement of these legs under the table so that a full number of people can be seated without inconvenience.

The mechanism which controls the travel of the tops of legs 12 is shown in Figue 5 in the position occupied when the table is raised. A portion of this mechanism is also shown in the section view of Figure 6. As seen in these figures, the tops of legs 12 are pivoted to a respective one of the four slides 36, these slides being movable between limits along the radial rods 38. The inner end of each of these rods is supported in the block 40 which is fastened to the bottom of deck 14 at its center, the outer end of each rod is attached to the deck near a corner by a bracket 42.

Pivoted to the top of each slide 36 is a link 44, or a link 46, which serves to draw the slide along its rod 38. These links are pivoted at their other ends to the arms of the rotatable spider 48. When this spider is rotated from the position shown in Figure 5 in the direction of arrow 50, the slides 36 will be drawn toward the block 40 and the table lowered. Spider 48 is pivoted at 52 to deck 14 and is adapted to be rotated by the lever 54 which is also pivoted at 50 and which here bears at one end against the wedge 56 fixed to the spider.

Figure 5:
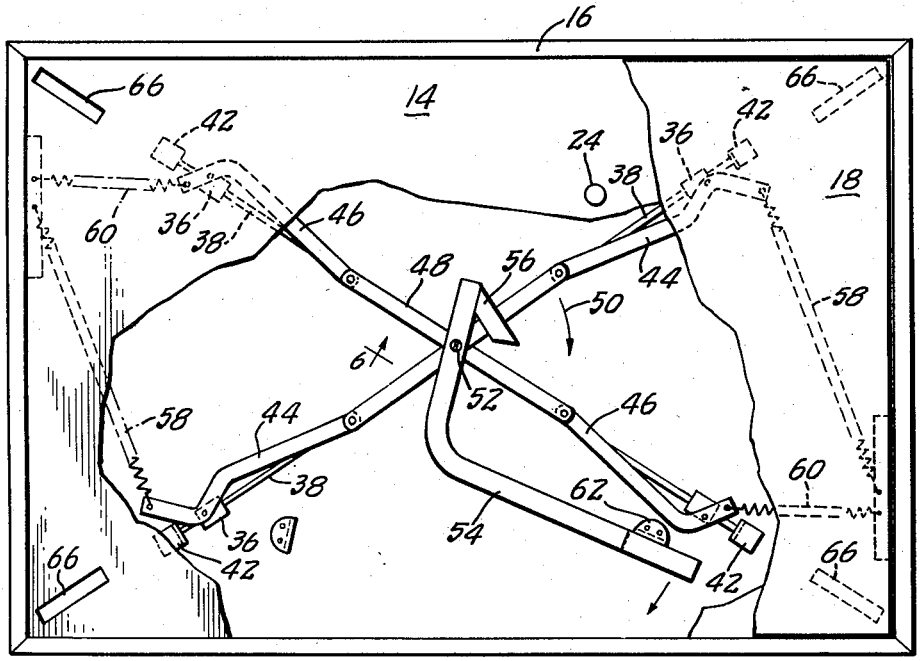
Figure 5 is a top view of the table with parts broken away showing the position of the leg operating mechanism when the table is raised.

The links 44, 46 are connected at their outer ends, as seen in Figure 5, to the tension springs 58 and 60, respectively which for the mechanism positioned as shown here with the outer end of lever 54 against the stop 62, hold the toggle, formed by spider 48 and links 44, 46, over-center and hence locked. Springs 58 and 60 are fixed at their other ends to the deck 14 at the points indicated.

Figure 6:
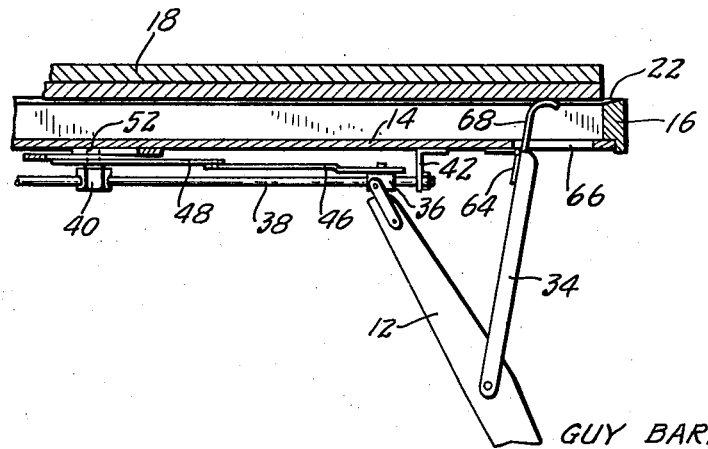
Figure 6 is a section view taken along lines 6—6 in Figure 5 and showing how the leaves of the table are automatically raised within the frame.

Referring to Figure 6, the tops of arms 34 are pivoted to the deck 14 by the hinges 64. Extending beyond the top of each arm 34 and through an opening 66 in deck 14 is an extension arm 68 which is attached to arm 34, whose upper end is curved and which in the position shown pushes the leaves 18 up relative to frame 16. When the slides 36 are moved toward block 40 in lowering the table, extension arms 68 will be rotated about hinge 64 and into and through the openings 66 thereby permitting the leaves 18 to move down within frame 16 and to rest next to deck 14. These elements occupying this position are shown in the side section view of Figure 8.

Figure 7:
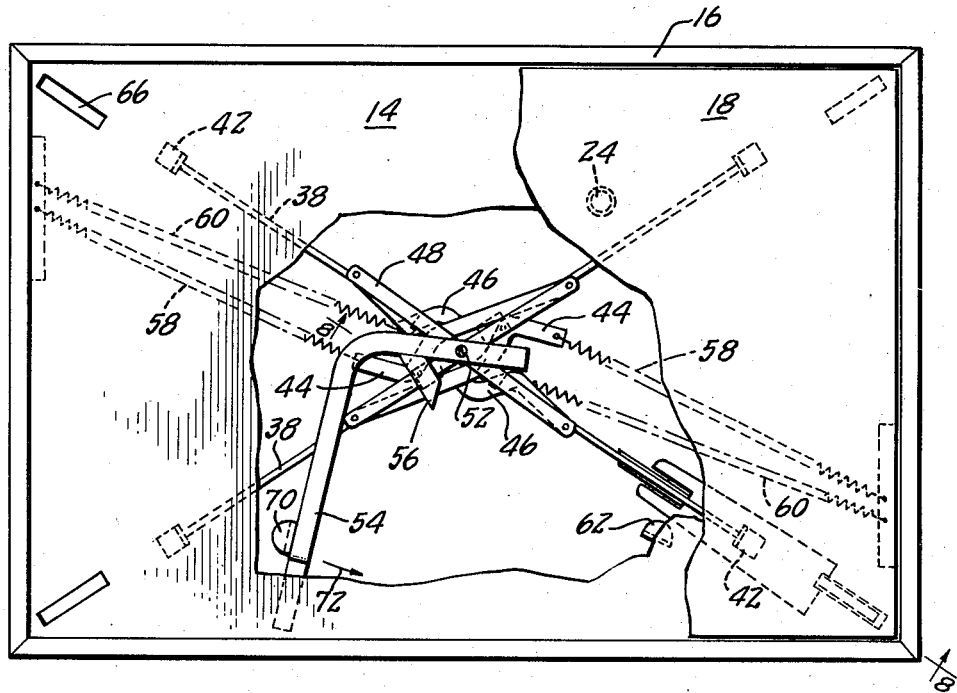
Figure 7 is a top view of the table with parts broken away showing the operating mechanism when the table is down.
Figure 8:
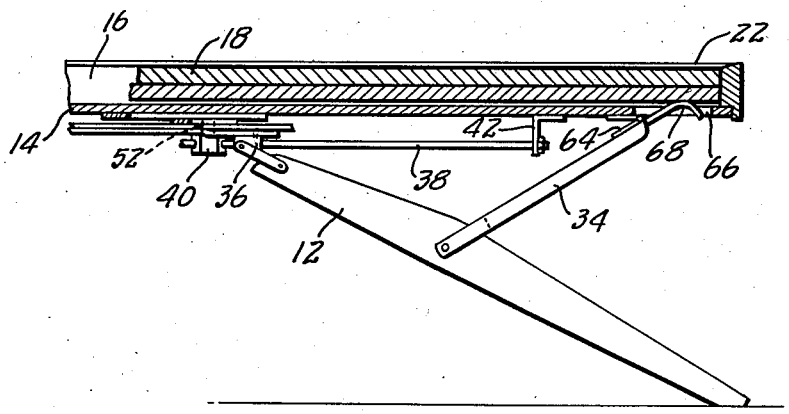
Figure 8 is a section view along lines 8—8 in Figure 7 showing how the leaves are automatically lowered within the frame.

When table 10 is in low position, the leg operating mechanism occupies the position shown from the top in Figure 7 and from the side in Figure 8. Here, the slides 36 and the top ends of legs 12 have moved along the rods 38 to their inner limit near the central pivot 52 and the block 40. Spider 48 has rotated almost 180 degrees from its previous position and now wedge 56 bears on the inside of lever 54 urging it against the stop 70. Springs 58 and 60 are now tensioned much more than previously and accordingly the energy stored in them will help raise the table to high position when lever 54 is rotated a sufficient distance along the arrow 72 to unlock the toggle which is once again overcenter. The links 44 and 46 are interleaved with each other and spider 48 as shown. The particular shapes for link 46 and link 44 which permit this are given in Figures 10a, 10b and 10c and in Figures 11a, 11b, respectively. The shape for lever 54 is given in Figures 9a, 9b.

In the table illustrated in Figures 1 and 2, the frame is rigidly fixed to the deck and cannot move relative to it. Figure 12 illustrates another embodiment of the invention wherein the frame is movable relative to the deck and lowers automatically when the table is raised. Here, as before, legs 12 at their upper ends are pivoted to the slides 36 which run along the rods 38. These rods are supported by brackets 42 underneath a deck 74 upon which the leaves 18 are pivoted. The arms 34, which at their lower ends are pivoted to legs 12, are connected at their tops by hinges 76 to the bottom side of deck 74. These arms are also connected through the double hinges 78 to the bracket 80 upon which the table frame 82 is mounted. The action of the double hinge 78 is such that as shown in Figure 12 when the table is up the top of frame 82 is level with the top of deck 74 and below the bottom of leaves 18, while when the table is in low position as shown in Figure 13, the top of the frame is level with the top of the leaves.

A different table 90 shown from the bottom in Figure 14 with its legs in low position and which embodies features of the invention, includes a deck 92 to which is hinged the four leg-supporting links. Each of these links is somewhat loosely pivoted at its lower end to a respective one of the legs 96 near the midpoint of the leg. The top end of each leg 96 is hinged to a block 98 which in turn is swivel mounted on one of the bars 99. Each bar 99 is pivoted at 100 to a disk 102 which is rotatably though snugly carried in a central opening in deck 98. This disk is free to rotate relative to deck 92 in the direction of arrow 103 from the position shown in Figure 14 to that shown in Figure 15. Rotation of this disk in the direction of arrow 103 moves legs 96 from their low to their high position.

The limit of rotation of disk 102 counter to the direction of arrow 103 in Figure 14 is determined by the bands 104 carried by bars 99 and which slidably encircle the pins 106 fixed to deck 92. The bottom surface of this disk is held flush with the bottom of deck 92 by means of these bands and bars. The tension springs 108, fixed to disk 102 at two points 100, and to deck 92 at two points not shown, tend to rotate the disk along arrow 103 and thus facilitate the raising of the table.

A bottom view of table 90 with its legs in high position is given in Figure 15. Here, disk 102 has been rotated 90° counter-clockwise from its position shown in Figure 14, and each block 98 has been moved closer to the hinge 94 of its respective leg 96. The path of travel of each block is generally semi-circular from a position closer to a corner of deck 92 and on one side of the center of disk 102 to a position farther from that corner and on the other side of the center. As a result, the limits between which these legs move can be widely spaced.

In the position shown in Figure 15 the legs are in high position and disk 102 has been rotated to its counter-clockwise limit. The forces acting on bars 99 are such that legs 96 are locked in this position until disk 102 is again intentionally rotated clockwise relative to deck 92.

As can be seen in Figure 15, deck 92 supports on its top surface the table leaf 110, and the leaves 112, which are hinged to the latter along the lines 114 and which can be unfolded as shown. In this position, leaf 110 is turned 90° relative to deck 92. It is adapted to lie at 0° relative to the deck and with leaves 112 folded upon it.

The rotation of the table leaves to and from the position shown in Figure 15 of itself causes the table to move from low to high position, and vice versa. As seen in Figure 16, which is a section taken as indicated in Figure 15, disk 102 is rigidly fixed to leaf 110. As a consequence, the disk rotates with the leaf raising or lowering the table legs as explained previously. The two limits to which these legs can be moved are indicated by solid and by dotted lines. It should be noted that the spacing of the leg feet remains approximately the same in each position.

The above description of the invention is intended in illustration and not in limitation thereof. Various changes in the embodiments illustrated may occur to those skilled in the art and these may be made without departing from the spirit or scope of the invention as set forth.

I claim:

1. A table extendable from low to high position comprising a rectangular top, four legs depending from said top and lying along angularly spaced vertical planes, four short members each pivoted between one of said legs and said top, and means to move said legs in unison underneath said top along a respective one of four independent radially spaced tracks each of which is generally parallel to a diagonal of said top to change the angular inclination of said legs to said top to raise or lower said table.

2. The combination of elements as in claim 1 wherein said top includes a deck, a frame, and two leaves adapted to be folded and recessed within said frame when said table is in low position, said four short members being hinged at their tops to the bottom side of said deck at points generally equidistant from its center.

3. The combination of elements as in claim 2 in further combination with four short extensions each attached to the top of one of said short members and adapted to pass through a corresponding opening in said deck to raise said leaves relative to said frame when said table is in high position.

4. The combination of elements as in claim 2 in which each of said four short members is each hinged to said deck and to said frame, said frame and deck being movable relative to each other, whereby when said table is in high position said frame will be below the top of said leaves.

5. In a table having four legs and being extendable from low to high position and in the low position having folded leaves pivoted to the table and recessed within a frame, means actuated by the table legs for raising the bottom of the leaves relative to the frame just below the top thereof when the table is raised to high position, and supplemental raising means actuated by the pivoting of the leaves as they are turned to a position for unfolding to raise the bottom thereof above the top of the frame until the leaves are rotated to said unfolding position.

6. The combination of elements as in claim 5 in which said supplemental raising means, when the leaves are rotated to said unfolding position, lowers them into contact with the frame whereby said leaves are locked against accidental rotation.

7. In a table extendable from low to high position and unfoldable into a larger size, a deck, legs depending therefrom, a frame surrounding said deck, leaves pivotally connected to said deck and adapted to be folded and recessed within said frame when the table is in low position, means actuated by the movement of said legs when said table is raised to high position for automatically moving said leaves up relative to said frame so that their bottom surface is slightly below the top of said frame, and supplemental raising means actuated by the pivoting of said leaves for raising the bottom of said leaves relative to said frame above the top thereof so that they can be rotated to unfolding position without rubbing said frame.

8. The combination of elements as in claim 7 in which said leaves are pivoted to said frame by a floating pivot, and in which said supplemental raising means includes a plurality of glides carried on the bottom of said leaves and adapted to extend through a first set of corresponding openings in said deck when said leaves are recessed within said frame, each of said openings having a beveled surface at its forward edge up which a corresponding one of said glides is adapted to climb when said leaves are rotated thereby to raise them above the top of said frame.

9. The combination of elements as in claim 8 in which said glides are adapted to move down into a second set of corresponding openings in said deck when said leaves are rotated to unfolding position and in which said first and second sets of openings have beveled surfaces at their forward edges only whereby said leaves can be rotated over one particular arc only.

10. A table extendable from low to high position comprising a top, at least three legs spaced beneath said top and movable relative thereto, at least three short arms each pivoted between the underside of said table at one of at least three points generally equidistant from the center thereof and an intermediate point of a corresponding one of said legs, and means connecting the top ends of said legs to the bottom of said top and adapted to move said ends along independent tracks which lie generally parallel to lines radiating from the center of said top, whereby the angle at which each of said legs is held relative to said top can be changed without substantially decreasing the spacings of the feet of said legs when said table is raised from low to high position.

11. A table extendable from low to high position comprising a top, four short arms each hinged at its top end to the bottom of said top near the corners of a rectangle inscribed thereon, four legs each pivoted at a point intermediate its foot and top ends to the bottom end of one of said arms, means pivotally connecting the top ends of said legs to the bottom of said top and adapted to move said top ends in unison closer to and away from the center of said rectangle and the corners thereof.

12. The combination of elements as in claim 11 in which said means includes a rotatable spider mounted at the center of said rectangle and linked to the top ends of said legs, rotation of said spider in one direction serving to spread apart the top ends of said legs and to over-center a toggle whereby when said table is raised to high position said legs will be locked in their respective positions.

13. The combination of elements as in claim 12 in which the top ends of said legs are pivotally connected to slides which run along four tracks or rails fastened to the bottom of said top, generally along diagonals of said rectangle, said slides being linked to said spider by links curved so that said spider and links will nest when said slides are in their limit position nearest said spider.

14. The combination of elements as in claim 13 in further combination with spring means connected so that movement of said legs from high to low position will store energy in said spring means whereby said table is easily raised from low to high position.

15. The combination of elements as in claim 11 in which said means includes a rotatable disk mounted at the center of said rectangle, blocks pivoted to the top ends of said legs, bars pivoted to said disk and carrying said blocks, and bands carried by said bars and encircling fixed pins mounted on the bottom of said top adjacent said disk.

16. A table extendable from low to high position comprising a deck, a frame surrounding said deck and attached thereto, leaves pivoted to said deck and adapted when folded to be recessed within said frame, four short arms hinged at their upper ends to the bottom of said deck near corresponding corners of a rectangle inscribed thereon, four legs each pivoted at a point intermediate its two ends to a lower end of one of said short arms, four slides each pivoted at its upper end to one of said legs, four rods each connected along the bottom of said deck and lying generally diagonally along said rectangle and coming together at their inner ends adjacent the center thereof, said slides being adapted to move along said rods and to be held thereby, means to move said slides along said rods in unison to raise and lower said table, and four short extensions each affixed to the top of a corresponding one of said short arms and adapted to move through corresponding openings in said deck to elevate said leaves relative to said frame when said table is in said high position.

17. The combination of elements as in claim 16 in which said means to move said slides includes a rotatable spider pivoted at the center of said rectangle beneath said deck, four links each connected between said spider and one of said slides, said spider and links being adapted to nest when said slides move adjacent to said center and to form an over-centered toggle when said slides move closest to said corners, and a plurality of springs each connected between one of said slides and a fixed point and adapted to store energy when said table is moved from high to low position.

18. The combination of elements as in claim 17 in which said short extensions when said table is in high position elevate the bottom of said leaves to a position slightly below the top of said frame, and in further combination with supplemental raising means for raising the bottom of said leaves above the top of said frame when said leaves are rotated to unfolding position and then to lower them into contact with said frame.

19. A table extendable from low to high position comprising a deck, leaves pivoted to said deck and adapted when folded to lie upon said deck, a first set of four short links hinged at their upper ends to the bottom of said deck near corresponding corners of a rectangle inscribed thereon, four legs each pivoted at a point intermediate its two ends to the lower end of one of said short arms, a set of four blocks hinged between the top ends of said legs and swivel supported along the bottom of said deck, and means to move said blocks in unison to raise and lower said table.

20. The combination of elements as in claim 19 in which said means to move said blocks includes a rotatable disk carried by said deck at the center of said rectangle, a set of four bars each pivoted to said disk and to a corresponding block of said set of blocks, and four bands each carried by one of said bars and slidable along a pin fixed to said deck, the tops of said legs being adapted to move past the center of said rectangle.

21. A table extendable from low to high position including a deck, a frame surrounding said deck and fixed thereto, leaves pivoted to said deck and adapted when folded to be recessed within said frame when said table is in low position, three short arms pivoted to the bottom of said deck near corners of a straight sided figure inscribed thereon, three legs pivoted at a point intermediate their ends to said arms and movably connected at their tops to the bottom of said deck, means to move said legs along independent tracks beneath said deck generally radially from the center of said figure to raise and lower said table, and elevating means actuated by the swinging of said short arms when said table is raised from low to high position to raise said leaves relative to said frame.

22. The combination of elements as in claim 21 in which said elevating means includes three short extensions fixed to the tops of said short arms and adapted to pass through openings in said deck and push against said leaves.

23. A table extendable from low to high position including a deck, table top leaves pivoted to said deck and adapted to be folded thereupon and to be rotated relative thereto and then unfolded to give a larger top area, four short arm-like links each hinged to the bottom of said deck near a respective corner of a rectangle inscribed thereon, four legs each pivoted at a point intermediate its ends to a respective one of said links, four blocks each pivoted to a top end of respective one of said legs, a disk-like member rotatably mounted near the center of said rectangle, four bars each having a slotted length and each pivoted to said member at a respective one of four points, and four pins fixed to said deck adjacent said member and each in slidable engagement with a respective one of said bars, whereby rotation of said member moves the tops of said legs to raise or lower said table.

24. The combination of elements as in claim 23 in which one of said leaves is connected to said member whereby rotation of the leaves relative to said deck raises or lowers said table.

25. A table extendable from low to high position comprising a generally rectangular deck, four legs depending from said deck, four short members each hinged between one of said legs and said deck, means to move the top ends of said legs underneath said top along four independent tracks each of which is generally parallel to a diagonal of said deck, a leaf pivoted to said deck and connected to said means whereby rotation of said leaf raises or lowers said table.

References Cited in the file of this patent

UNITED STATES PATENTS

| | | |
|---|---|---|
| 2,181,262 | Chark | Nov. 28, 1939 |
| 2,184,500 | Knowles | Dec. 26, 1939 |
| 2,213,681 | Symmonds | Sept 3, 1940 |
| 2,354,106 | Cooper | July 18, 1944 |
| 2,508,405 | Lazard | May 23, 1950 |
| 2,544,228 | Hoppe | Mar. 6, 1951 |
| 2,544,229 | Hoppe | Mar. 6, 1951 |
| 2,582,791 | Page | Jan. 15, 1952 |
| 2,602,717 | Novick | July 8, 1952 |
| 2,673,773 | Dusenbury | Mar. 30, 1954 |